US011550919B2

United States Patent
Dhillon et al.

(10) Patent No.: US 11,550,919 B2
(45) Date of Patent: Jan. 10, 2023

(54) PRIORITIZING PATCHING OF VULNERABLE COMPONENTS

(71) Applicant: EMC IP Holding Company LLC, Hopkinton, MA (US)

(72) Inventors: Danny V. Dhillon, Bothell, WA (US); Charles W. Kaufman, Redmond, WA (US); Eric Baize, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 292 days.

(21) Appl. No.: 16/798,705

(22) Filed: Feb. 24, 2020

(65) Prior Publication Data

US 2021/0264031 A1 Aug. 26, 2021

(51) Int. Cl.
*G06F 21/57* (2013.01)
*G06F 8/65* (2018.01)

(52) U.S. Cl.
CPC .............. *G06F 21/572* (2013.01); *G06F 8/65* (2013.01); *G06F 21/577* (2013.01); *G06F 2221/033* (2013.01)

(58) Field of Classification Search
CPC ........ G06F 21/572; G06F 21/577; G06F 8/65; G06F 2221/033
See application file for complete search history.

(56) References Cited

U.S. PATENT DOCUMENTS

| 2016/0246590 A1* | 8/2016 | Yu ............................ G06F 8/656 |
| 2017/0026401 A1* | 1/2017 | Polyakov .............. H04L 63/101 |
| 2020/0204578 A1* | 6/2020 | Colquhoun ............. H04L 67/36 |
| 2020/0249928 A1* | 8/2020 | Zeng ................... H04L 63/1433 |
| 2022/0083652 A1* | 3/2022 | Ransford .............. G06F 21/552 |

OTHER PUBLICATIONS

"Roles and Benefits for SBOM Across the Supply Chain" NTIA. gov, Nov. 2019, 28 Pages.*
Lipner, Steve, Software products aren't cookies, CSO, available at https://www.csoonline.com/article/3299300/software-products-aren-t-cookies.html. Aug. 20, 2018, 4 Pages.
Software Package Data Exchange (SPDX®), Specification Version: 2.1, Linux Foundation and its Contributors, Nov. 2016, 109 Pages.

* cited by examiner

*Primary Examiner* — Matthew T Henning
(74) *Attorney, Agent, or Firm* — Ryan, Mason & Lewis, LLP

(57) ABSTRACT

Methods, apparatus, and processor-readable storage media for prioritizing patching of vulnerable components are provided herein. An example computer-implemented method includes obtaining information indicative of a first set of components embedded in a software package; determining risk levels for respective ones of the components in the first set based on a data flow representation of the software package; and assigning a priority for patching a software vulnerability in a given component of the first set based at least in part on the risk level of the given component.

20 Claims, 6 Drawing Sheets

301: OBTAIN LIST OF COMPONENTS;

302: OBTAIN DATA FLOW REPRESENTATION OF THE SOFTWARE PACKAGE;

303: IF EACH COMPONENT IN THE LIST IS NOT REPRESENTED IN THE DATA FLOW REPRESENTATION, OUTPUT INDICATION;

304: FOR EACH RESPECTIVE COMPONENT IN THE LIST:

305:     DETERMINE CONTEXT OF THE RESPECTIVE COMPONENT IN THE DATA FLOW REPRESENTATION;

306:     DETERMINE A GRADIENT MODIFIER VALUE FOR THE RESPECTIVE COMPONENT BASED ON THE CONTEXT;

307: CALCULATE PRIORITIES FOR PATCHING SOFTWARE VULNERABILITIES BY MULTIPLYING A SCORE ASSOCIATED WITH EACH OF THE SOFTWARE VULNERABILITIES BY THE GRADIENT MODIFIER VALUE OF THE CORRESPONDING COMPONENT

PRIORITIZING PATCHING OF VULNERABLE COMPONENTS

FIELD

The field relates generally to information processing systems, and more particularly to techniques for security in such systems.

BACKGROUND

Increasingly, customers are insisting on improved transparency regarding components included in software packages so that they can assess the security of their environment and infrastructure in the face of dynamic threats. Some vendors include a Software Bill of Materials (S-BOM) along with the software, which includes component level information. When a vulnerability is announced, customers can reference the S-BOM to determine whether their software includes the component corresponding to the vulnerability. A software patch may be applied in some instances to address the vulnerability. The S-BOM often causes false positives (e.g., the component may have been modified by the vendor or the component may not be exploitable), thereby creating unnecessary work for both the customer and the vendor. False positive rates may also result, for example, from sharing software component information.

A need exists for improved techniques for efficiently prioritizing patches to improve the overall security of the system.

SUMMARY

Illustrative embodiments of the disclosure provide techniques for prioritizing patching of vulnerable components. An exemplary method includes obtaining information indicative of a first set of components embedded in a software package; determining risk levels for respective ones of the components in the first set based on a data flow representation of the software package; and assigning a priority for patching a software vulnerability in a given component of the first set based at least in part on the risk level of the given component.

Illustrative embodiments can provide significant advantages relative to conventional techniques for patching vulnerabilities. For example, challenges associated with excessive false positive rates resulting from sharing software component information are overcome by prioritizing patching of vulnerable components based on how those components are used in a particular system. This allows, for example, the number of false positives to be reduced and allows vulnerabilities to be patched in a more efficient manner, thereby improving the overall security of the system.

These and other illustrative embodiments described herein include, without limitation, methods, apparatus, systems, and computer program products comprising processor-readable storage media.

BRIEF DESCRIPTION OF THE DRAWINGS

FIG. 3 illustrates exemplary pseudocode for a patch prioritization process, according to one embodiment of the disclosure.

DETAILED DESCRIPTION

Illustrative embodiments of the present disclosure will be described herein with reference to exemplary computer networks and associated computers, servers, network devices or other types of processing devices. It is to be appreciated, however, that the disclosure is not restricted to use with the particular illustrative network and device configurations shown. Accordingly, the term "computer network" as used herein is intended to be broadly construed, so as to encompass, for example, any system comprising multiple networked processing devices.

Figure 1:
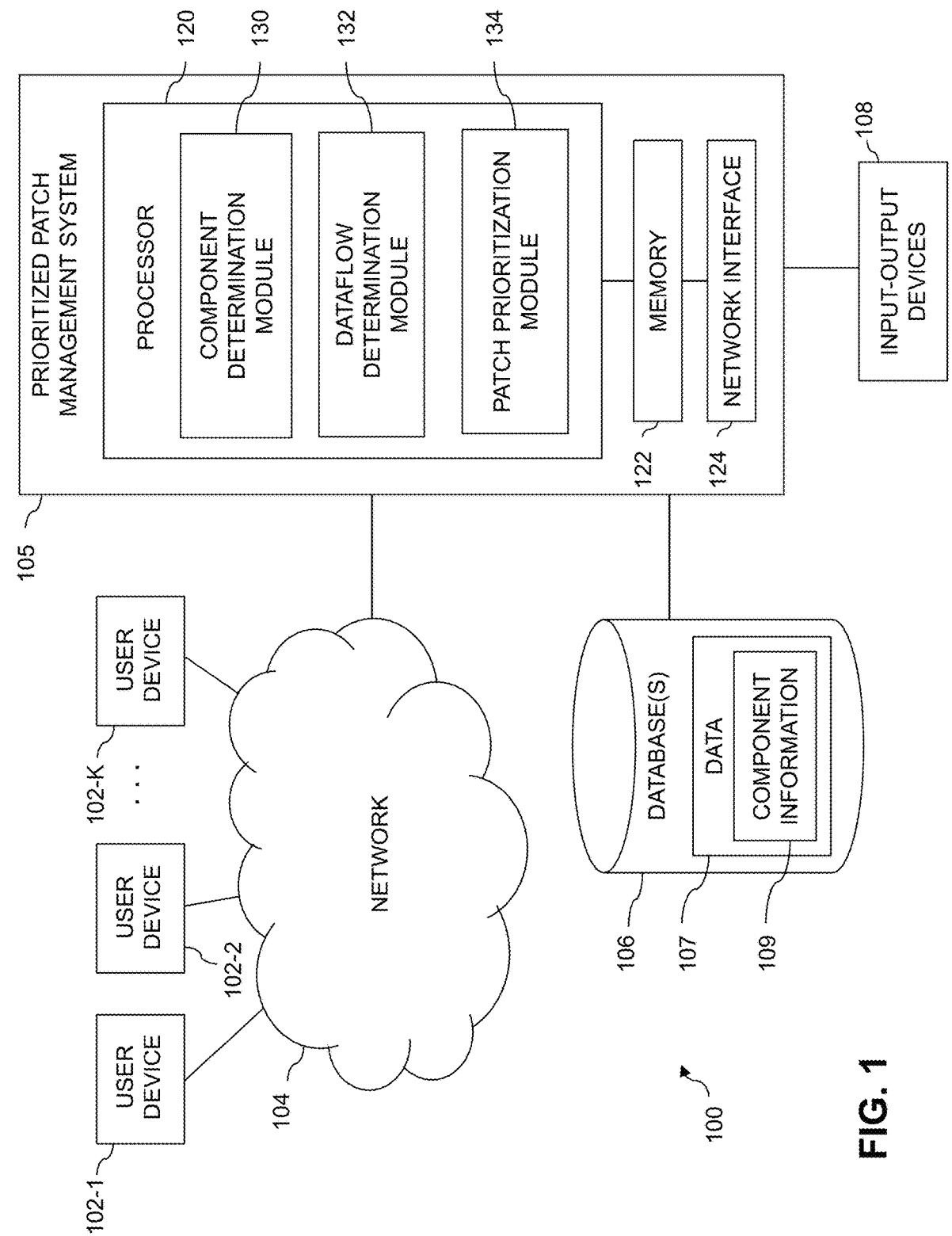
FIG. 1 shows an information processing system configured for prioritizing patching of vulnerable components in an illustrative embodiment.

FIG. 1 shows a computer network (also referred to herein as an information processing system) 100 configured in accordance with an illustrative embodiment of the disclosure. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers." The user devices 102 may include any suitable means for performing Human Computer Interaction.

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the user devices 102 (or prioritized patch management system 105) can have an associated database 106 configured to store data 107 pertaining to, for example, component information 109. The component information 109 may include package name information, version information, file names, supplier information, originator information, download location(s), verification codes, and/or license information, for example.

The database 106 in the present embodiment is implemented using one or more storage systems associated with user devices 102 (or prioritized patch management system 105). Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the prioritized patch management system 105 are input-output devices 108, which illustratively comprise keyboards, displays or other types of input-output devices in any combination. Such input-output devices can be used, for example, to support one or more user interfaces to the prioritized patch management system 105, as well as to support communication between user devices 102, the prioritized patch management system 105, and other related systems and devices not explicitly shown.

The prioritized patch management system 105 in the FIG. 1 embodiment is assumed to be implemented using at least one processing device. Each such processing device generally comprises at least one processor and an associated memory, and implements one or more functional modules for controlling certain features of the prioritized patch management system 105.

More particularly, the prioritized patch management system 105 in this embodiment can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the prioritized patch management system 105 to communicate over the network 104 with the user devices 102, and illustratively comprises one or more conventional transceivers.

The processor 120 further comprises a component determination module 130, a dataflow determination module 132, and a patch prioritization module 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the component determination module 130, the dataflow determination module 132, and the patch prioritization module 134 may be implemented at least in part in the form of software that is stored in memory 122 and executed by processor 120.

It is to be understood that the particular set of elements shown in FIG. 1 for prioritized patching of vulnerable components of a system involving prioritized patch management system 105 and user devices 102 of computer network 100 is presented by way of illustrative example only, and in other embodiments additional or alternative elements may be used. Thus, another embodiment includes additional or alternative systems, devices and other network entities, as well as different arrangements of modules and other components.

As used herein, the term "patching a software vulnerability" shall be broadly construed so as to encompass, for example, downloading, replacing and/or installing a patch or another software component that addresses or otherwise mitigates a software vulnerability, as would be apparent to a person of ordinary skill in the art.

An exemplary process utilizing the component determination module 130, the dataflow determination module 132, and the patch prioritization module 134 of the prioritized patch management system 105 in computer network 100 will be described in more detail with reference to the flow diagram of FIG. 4.

There is increasing demand for transparency of components included in software packages. In this regard, an open standard for communicating software bill of material information (including component, licenses, copyrights, and security references) has been established by Software Package Data Exchange® (SPDX®). This component information may be provided in the form of an S-BOM, which can be generated manually (e.g., via a spreadsheet) or using various software composition analysis mechanisms, such as, for example, Open Web Application Security Project (OWASP®) Dependency Check or Black Duck® Software Composition Analysis.

As noted above, sharing component level information (such as via an S-BOM, for example) generally leads to an increase in false positives of software vulnerabilities. Such false positives can cause resources to be used in an inefficient manner, such as, for example, generating and deploying patches for vulnerabilities that are not exploitable.

Accordingly, exemplary embodiments herein describe techniques for prioritizing patching of vulnerable components by incorporating the context of how given components are used within the broader system. For example, additional information can be provided to customers that specifies whether a given component is a risky component. According to at least one example embodiment, an S-BOM may be augmented to include this additional information.

It is noted that the term "risky component" is used herein to refer to a software component which (1) is associated with an input data flow that includes tainted data and (2) reads or writes sensitive data (directly or indirectly). It is noted that the term "tainted data" is used herein to refer to data that originates externally, and the term "sensitive data" is used herein to refer to data that includes sensitive information, such as, for example, encryption keys, access control lists (ACLs), customer data, personal information, regulated data, etc.

One or more exemplary embodiments include determining dataflows of a software package. The context of individual components of the software package may then be determined, such as, for example, whether a given component is a risky component or safe component. The dataflows may be determined using automated techniques (e.g., static analysis) and/or manual techniques (e.g., Champion-, Advisor-, and/or Consultant-driven threat modeling). The dataflows may be represented in any suitable format, such as, for example, a dataflow diagram as described in further detail below in conjunction with FIG. 2.

Figure 2:
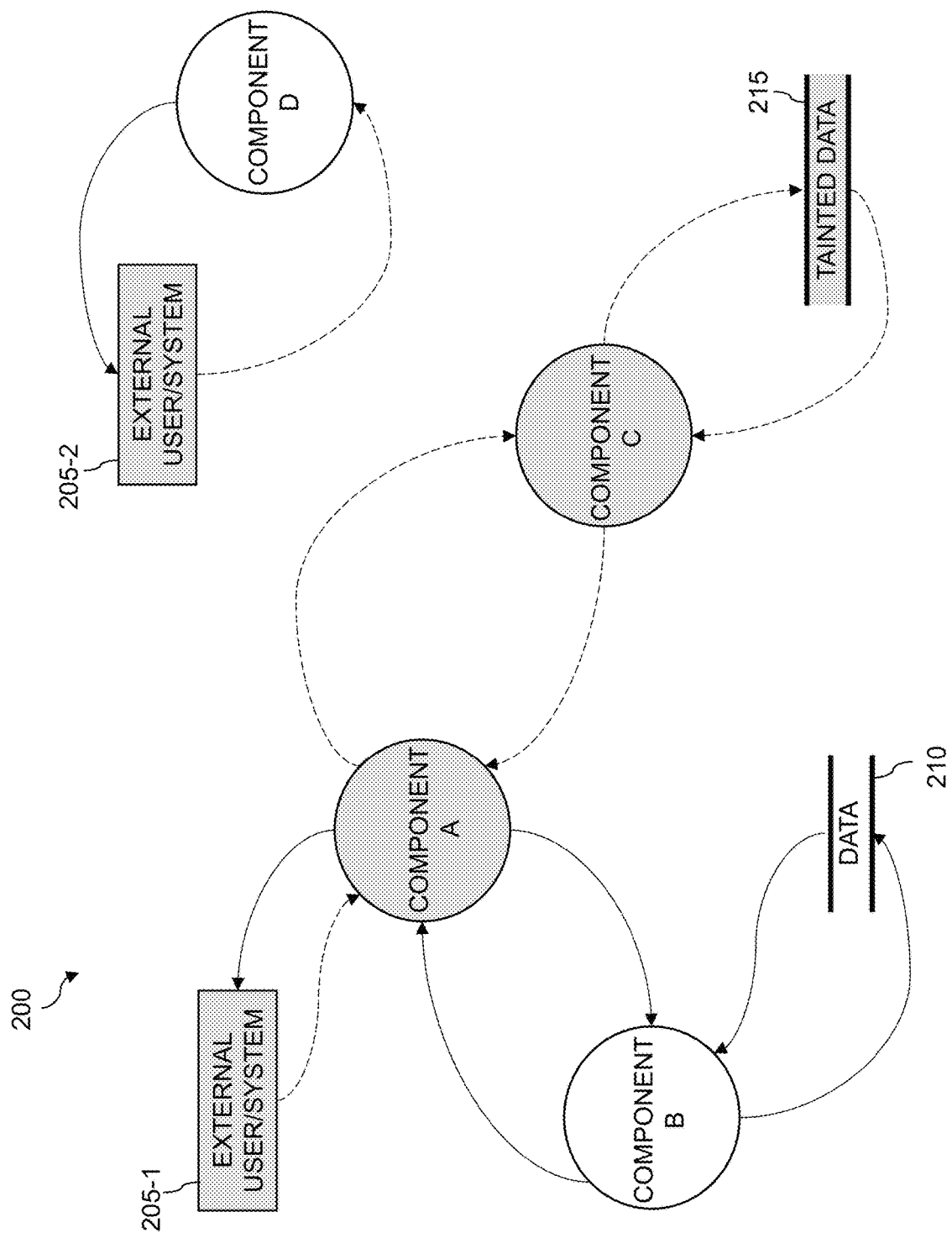
FIG. 2 shows a non-limiting example of a data flow representation in accordance with an illustrative embodiment.

Referring now to FIG. 2, this figure shows a non-limiting example of a data flow representation 200 of a software package (or architecture) in accordance with an illustrative embodiment. The data flow representation 200 includes four software components (i.e., Components A through D), two external systems (or users) 205-1, 205-2, and two data stores 210, 215. In this example, the data store 215 comprises tainted data and the data store 210 comprises non-tainted (or safe) data. Based on the data flow representation 200, it can be determined that Components A and C are risky components, whereas Components B and D are safe components. Component B is safe because it does not receive a tainted input data flow. Component D receives a tainted input data flow from external system/user 205-2, but is still safe as it does not read and/or write sensitive data.

It is to be appreciated that the data flow representation 200 is a simplified example, and in one or more embodiments, such representations may be more complex. For example, the data flow representation 200 may include indications of other contextual information, such as, for example, a type of each of the dataflows (e.g., tainted dataflows, sensitive dataflows, etc.), security controls implemented by software package (e.g., mechanisms for mitigating threats), and/or privileges (e.g., authenticated user, unauthenticated user, trusted user, etc.). The format of the data flow representation 200 is also not intended to be limiting, and it is to be appreciated that it is possible to use other formats. For example, the data flow representation 200 may include one or more data flow diagrams, one or more sequence diagrams, and one or more subject-object matrices. The data flow representation 200 may be indicated using any suitable format, such as, using text, tables, and/or diagrams, as non-limited examples.

Referring now to FIG. 3, this figure shows example pseudocode 300 in accordance with exemplary embodiments. Pseudocode 300 may be implemented using software code in any combination of one or more programming languages for execution by or under the control of a processing platform, such as prioritized patch management system 105, or another type of processing platform. For example, the pseudocode 300 may be viewed as corresponding to a portion of a software implementation of at least part of the modules 130, 132 and/or 134 of the FIG. 1 embodiment.

At line 301, a list of components of a software package is obtained. By way of example, the list of components may be extracted based on results of an automated dependency checker, extracted from one or more spreadsheets, and/or the like. At line 302, a data flow representation of the software package is obtained (such as, for example, data flow representation 200). The data flow representation may be obtained using one or more automated techniques (e.g., using one or more automated and/or manual techniques as described herein). Line 303 verifies whether each component in the list is also represented in the data flow representation. In particular, if the verification fails (e.g., there are components in the list that are not included in the data flow representation), then an indication is output (such as, for example, an error or an indication that identifies the missing components). In this way, a user may revise or add the missing components to the data flow representation.

If each verification succeeds, then a context of each respective component is determined and a gradient modifier value for the respective component is determined based on the context, as indicated at lines 304-306. The context may be extracted based at least in part on the information indicated in the data flow representation. According to one or more embodiments, the context can be extracted in an automated manner, such as, for example, based on a static and/or dynamic analysis.

At line 307, priority values for patching software vulnerabilities are calculated by multiplying a score associated with a type of each of the software vulnerabilities (e.g., the Common Vulnerability Scoring System (CVSS) score) by the gradient modifier value of the corresponding component. In some example embodiments, the priority values are assigned labels or placed in different groups based on predetermined thresholds (e.g., a priority value may be assigned a 'lowest' priority label if it satisfies a first threshold, a 'low' priority label if it satisfies a second threshold, etc.).

It is to be appreciated that pseudocode 300 is merely an example and is not intended to be limiting. For example, it is to be appreciated that in some embodiments lines 301-306 (which determine the gradient modifier value of each component of the software package) may correspond to an initial set of operations, and line 307 may be performed in response to a vulnerability being discovered in one of the components.

According to at least some example embodiments, the context of a software component may be determined using one or more criterion or rules. As a non-limiting example, a set of rules may include, for example, one or more of: whether or not a component enforces a security control; whether or not a component receives tainted input data flow; whether or not taint inputted to a component originates from an unauthenticated user, authenticated user, or trusted user; whether or not a component reads sensitive (to disclosure) information; whether or not a component writes sensitive (to modification) information; whether or not a component communicates with or spawns a process that reads or writes sensitive information; whether or not a component has been hardened to reduce attack surface; and whether a component is deployed in a least privileged manner.

As a non-limiting example, the gradient modifier value may be assigned a value between zero and one, wherein a lower value indicates a component is relatively safer (and thus lower priority) as compared to components with higher values. It is to be appreciated that the gradient modifier may be implemented differently depending on the implementation, such as, for example, using a different range of values. By way of example, consider a software package having the following three components:

Component 1 that directly (or indirectly) reads and/or writes sensitive data; and accepts tainted data over a network;

Component 2 that directly (or indirectly) reads and/or writes sensitive data, and accepts tainted data locally only; and Component 3 that does not read or write sensitive data (neither directly nor indirectly); and does not receive a tainted input data flow.

In this example, Component 1 may be assigned the highest modifier value of the three components (e.g., m=1), Component 2 may be assigned a slightly lower modifier value than Component 1 (e.g., m=0.8), and Component 3 may be assigned the lowest modifier value (e.g., m=0.1).

Figure 4:
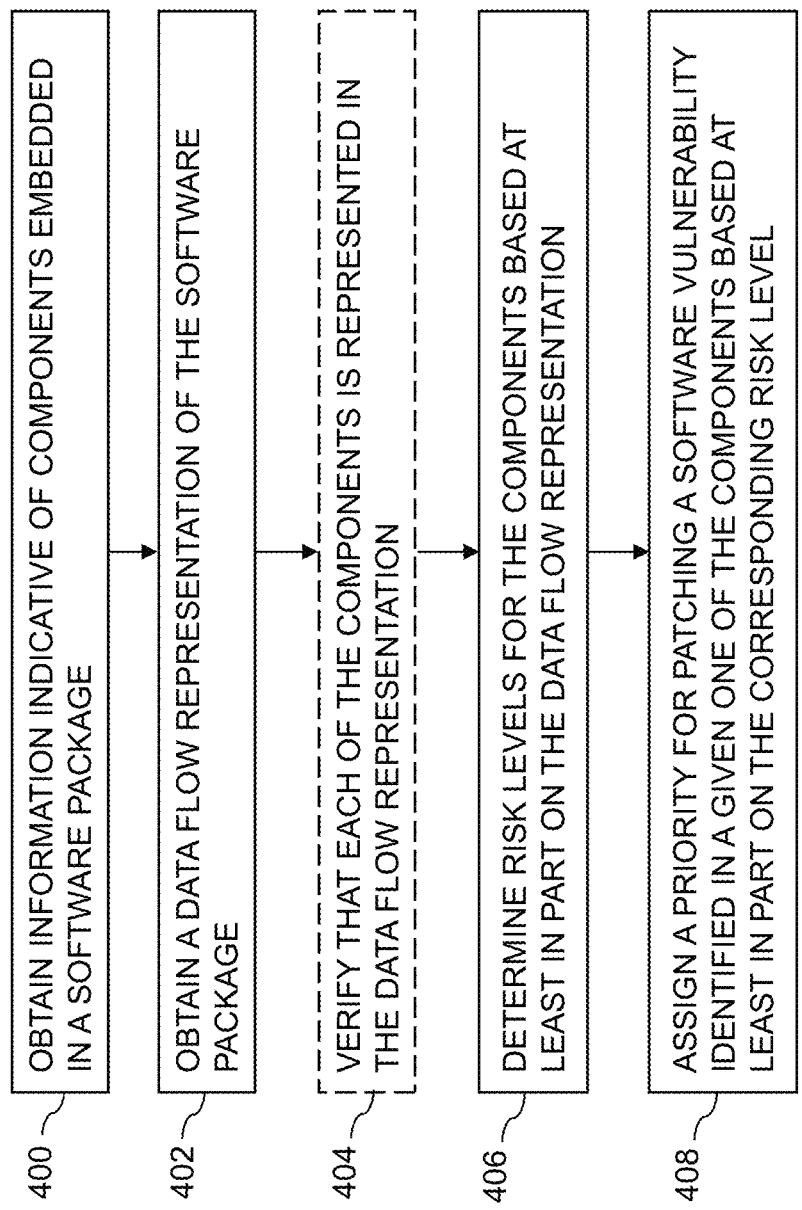
FIG. 4 is a flow diagram of a process for patching of vulnerable components in an illustrative embodiment.

FIG. 4 is a flow diagram of a process for prioritizing patching of vulnerable components in an illustrative embodiment. It is to be understood that this particular process is only an example, and additional or alternative processes can be carried out in other embodiments.

In this embodiment, the process includes steps 400 through 408. These steps are assumed to be performed by the processor 120 utilizing its modules 130, 132, and 134.

Step 400 includes obtaining information indicative of a first set of components embedded in a software package. Step 402 includes obtaining a data flow representation of the software package. Optional step 404 includes verifying that each component in the first set is represented in the data flow representation. Step 406 includes determining risk levels for the components in the first set based on the data flow representation of the software package. Step 408 includes assigning a priority for patching a software vulnerability in a given component of the first set based at least in part on the risk level of the given component.

Step 404 may include, for example, identifying a second set of components from the data flow representation and verifying that the second set of components comprises each component in the first set. In this way, step 404 may be used to ensure that the data flow representation of software package accounts for all of the components that are identified in, for example, an S-BOM of the software package.

The data flow representation may be generated based on one or more of a static analysis and a threat-model analysis. The obtained information may be generated using a software composition analysis mechanism. Determining the risk levels at step 406 may include determining, based on the data flow representation, whether or not each of the components in the first set both (i) receives tainted input data and (ii) one or more of reads and writes sensitive data. Each of the risk levels may include a modifier value based on one or more characteristics of the corresponding component in the data flow representation. The one or more characteristics may include at least one of: whether or not the component enforces a security control; whether or not the component received a tainted input data flow; whether or not the tainted input data flow originates from a trusted user; whether or not sensitive information is read; whether or not sensitive information is written; whether or not the component spawns a process that reads and/or writes sensitive information; whether or not the component communicates with a process that reads and/or writes sensitive information; whether or not the component is hardened to reduce an attack surface; or whether or not the component is deployed in a least privilege manner. Assigning the priority for patching the software vulnerability at step 408 may include adjusting a score associated with a type of the software vulnerability by the modifier value of the given component. The information obtained at step 400 may include a software bill of materials. The process may include a step of augmenting the software bill of materials with the determined risk levels.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to prioritize patching of software vulnerabilities. These and other embodiments can effectively enable customers to efficiently prioritize patches and stay protected, increase the speed in which necessary patches are provided, reduce wasted efforts on unnecessary patches, and/or expedite patch decisions based on an upfront analysis on the riskiness of a component.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
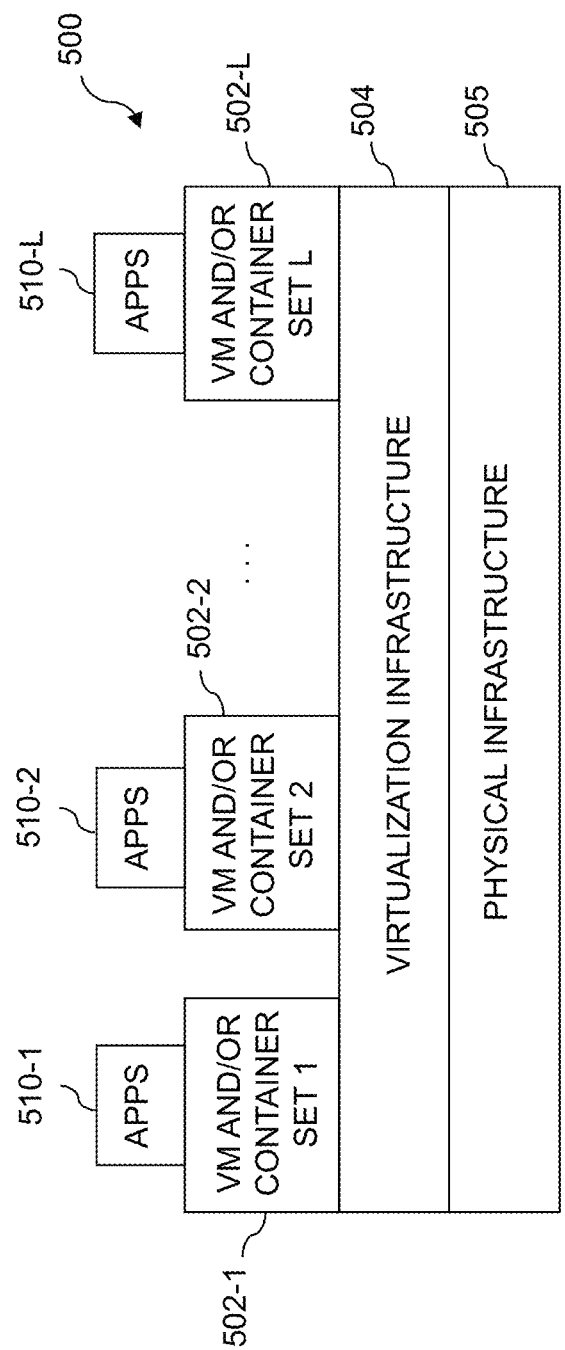
FIGS. 5 and 6 show examples of processing platforms that may be utilized to implement at least a portion of an information processing system in illustrative embodiments.
Figure 6:
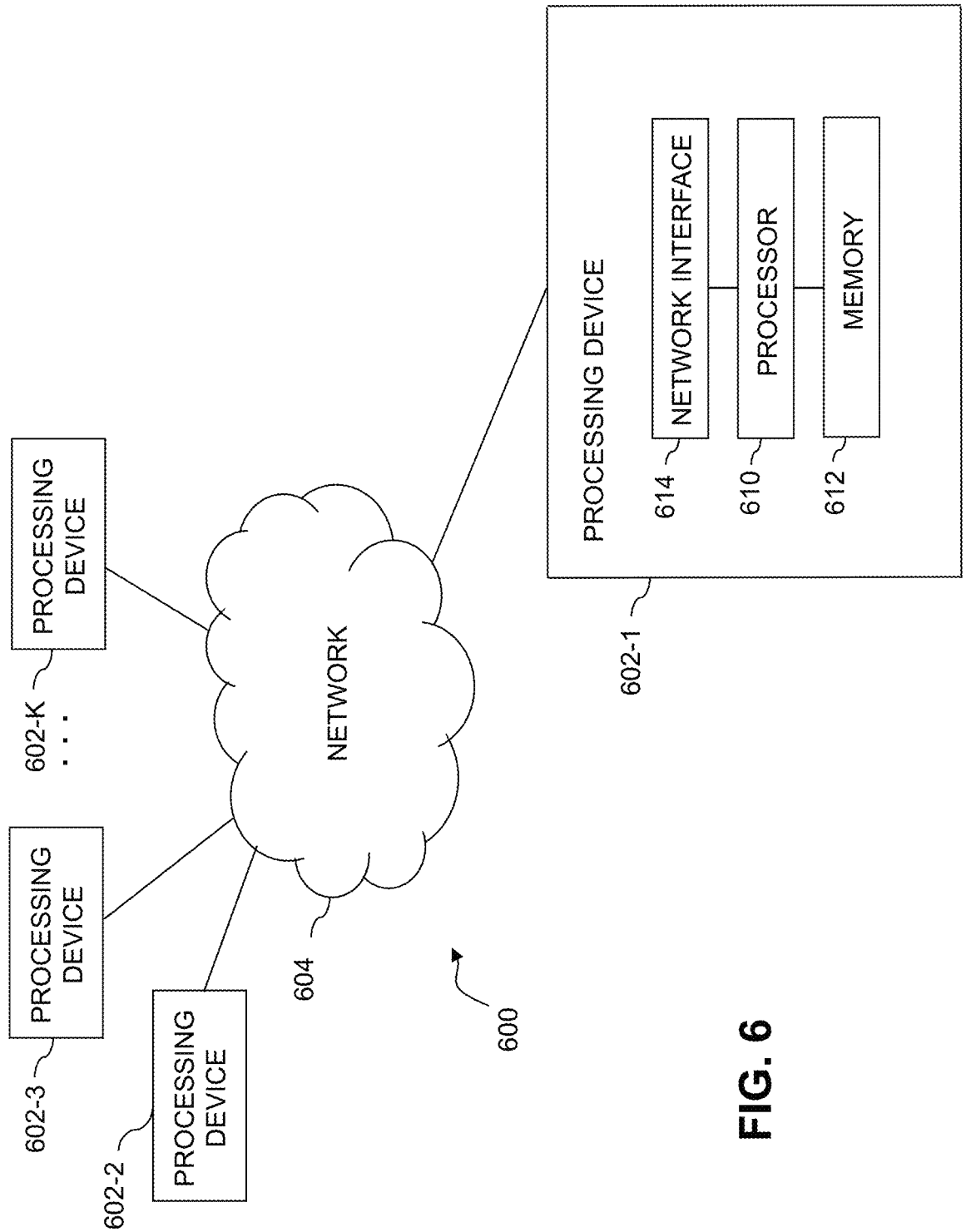

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an ASIC, an FPGA or other type of processing circuitry, as well as portions or combinations of such circuitry elements.

The memory 612 may comprise RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide secure authentication processes involving multiple user devices. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining information indicative of a first set of components embedded in a software package;
    obtaining a data flow representation generated for the software package, wherein the data flow representation is indicative of a second set of components embedded in the software package;
    determining risk levels for respective ones of the components in the first set based on the data flow representation of the software package, wherein the determining the risk level for a given component in the first set comprises: (i) verifying that the second set of components comprises the given component and (ii) determining, from the data flow representation, that the given component in the first set both receives input data that originates from an external source, relative to the given component, and one or more of: reads and writes sensitive data; and
    assigning a priority for patching a software vulnerability in the given component of the first set based at least in part on the risk level of the given component;
    wherein the method is performed by at least one processing device comprising a processor coupled to a memory.

2. The computer-implemented method of claim 1, wherein the verifying comprises:
    verifying that the second set of components comprises each component in the first set.

3. The computer-implemented method of claim 2, wherein the data flow representation of the software package is generated based on one or more of a static analysis and a threat-model analysis.

4. The computer-implemented method of claim 1, wherein the obtained information is generated using a software composition analysis mechanism.

5. The computer-implemented method of claim 1, wherein each of the risk levels comprises a modifier value based on one or more characteristics of the corresponding component in the data flow representation.

6. The computer-implemented method of claim 5, wherein the one or more characteristics comprise at least one of:
    whether or not the component enforces a security control;
    whether or not the component received a tainted input data flow;
    whether or not the tainted input data flow originates from a trusted user;
    whether or not sensitive information is read;
    whether or not sensitive information is written;
    whether or not the component spawns a process that reads and/or writes sensitive information;
    whether or not the component communicates with a process that reads and/or writes sensitive information;
    whether or not the component is hardened to reduce an attack surface; or
    whether or not the component is deployed in a least privilege manner.

7. The computer-implemented method of claim 5, wherein assigning the priority for patching the software vulnerability in the given component comprises:
    adjusting a score associated with a type of the software vulnerability by the modifier value of the given component.

8. The computer-implemented method of claim 1, wherein the information comprises a software bill of materials, and wherein the method comprises augmenting the software bill of materials with the determined risk levels.

9. A computer program product comprising a non-transitory processor-readable storage medium having stored therein program code of one or more software programs, wherein the program code when executed by at least one processing device causes the at least one processing device:
    to obtain information indicative of a first set of components embedded in a software package;
    to obtain a data flow representation generated for the software package, wherein the data flow representation is indicative of a second set of components embedded in the software package;
    to determine risk levels for respective ones of the components in the first set based on the data flow representation of the software package, wherein the determining the risk level for a given component in the first set comprises: (i) verifying that the second set of components comprises the given component and (ii) determining, from the data flow representation, that the given component in the first set both receives input data that originates from an external source, relative to the given component, and one or more of: reads and writes sensitive data; and to assign a priority for patching a software vulnerability in the given component of the first set based at least in part on the risk level of the given component.

10. The computer program product of claim 9, wherein the verifying comprises: verifying that the second set of components comprises each component in the first set.

11. The computer program product of claim 10, wherein the data flow representation of the software package is generated based on one or more of a static analysis and a threat-model analysis.

12. The computer program product of claim 9, wherein the obtained information is generated using a software composition analysis mechanism.

13. The computer program product of claim 9, wherein each of the risk levels comprises a modifier value based on one or more characteristics of the corresponding component in the data flow representation.

14. The computer program product of claim 13, wherein the one or more characteristics comprise at least one of:
whether or not the component enforces a security control;
whether or not the component received a tainted input data flow;
whether or not the tainted input data flow originates from a trusted user;
whether or not sensitive information is read;
whether or not sensitive information is written;
whether or not the component spawns a process that reads and/or writes sensitive information;
whether or not the component communicates with a process that reads and/or writes sensitive information;
whether or not the component is hardened to reduce an attack surface; or
whether or not the component is deployed in a least privilege manner.

15. The computer program product of claim 13, wherein assigning the priority for patching the software vulnerability in the given component comprises:

adjusting a score associated with a type of the software vulnerability by the modifier value of the given component.

16. The computer program product of claim 9, wherein the information comprises a software bill of materials, and wherein the at least one processing device is further caused to augment the software bill of materials with the determined risk levels.

17. An apparatus comprising:
at least one processing device comprising a processor coupled to a memory;
the at least one processing device being configured:
to obtain information indicative of a first set of components embedded in a software package;
to obtain a data flow representation generated for the software package, wherein the data flow representation is indicative of a second set of components embedded in the software package;
to determine risk levels for respective ones of the components in the first set based on the data flow representation of the software package, wherein the determining the risk level for a given component in the first set comprises: (i) verifying that the second set of components comprises the given component and (ii) determining, from the data flow representation, that the given component in the first set both receives input data that originates from an external source, relative to the given component, and one or more of: reads and writes sensitive data; and
to assign a priority for patching a software vulnerability in the given component of the first set based at least in part on the risk level of the given component.

18. The apparatus of claim 17, wherein the verifying comprises:
verifying that the second set of components comprises each component in the first set.

19. The apparatus of claim 18, wherein the data flow representation of the software package is generated based on one or more of a static analysis and a threat-model analysis.

20. The apparatus of claim 17, wherein the obtained information is generated using a software composition analysis mechanism.

* * * * *